UNITED STATES PATENT OFFICE.

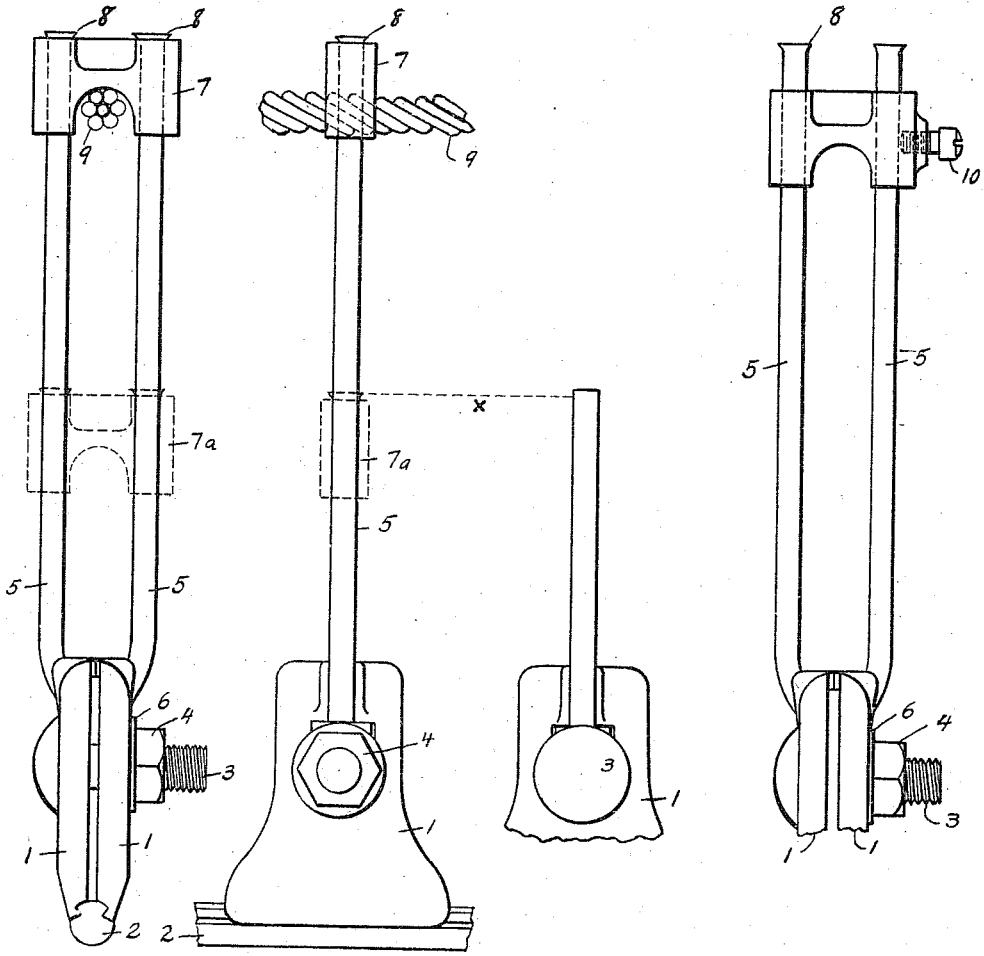

GLENN HENRY BOLUS AND WILLIAM A. DARRAH, OF MANSFIELD, OHIO, ASSIGNORS TO THE OHIO BRASS COMPANY, OF MANSFIELD, OHIO, A CORPORATION OF NEW JERSEY.

TROLLEY-WIRE HANGER.

1,296,748.      Specification of Letters Patent.      Patented Mar. 11, 1919.

Application filed May 2, 1917. Serial No. 165,939.

*To all whom it may concern:*

Be it known that we, GLENN H. BOLUS and WILLIAM A. DARRAH, citizens of the United States, residing at Mansfield, in the county of Richland and State of Ohio, have invented certain new and useful Improvements in Trolley-Wire Hangers, of which the following is a specification.

This invention relates to hangers for trolley wires and is intended primarily for suspending such trolley wires from a messenger or catenary cable although the principle involved is such that the invention can be used with other forms of suspending device.

One object of our invention is to provide a hanger which can be readily adjusted as to length in the field, and at the time it is intended to use the device. It is well known in the catenary form of suspension of trolley wires, that is, where the trolley wire is maintained in a horizontal plane and suspended from a catenary cable which has a sag, that it is necessary to use connecting devices between the catenary cable and the trolley wire which are of varying lengths. This makes it necessary for the manufacturer to produce and the user to purchase a considerable variety of lengths of hangers and it has been found that when the actual work of installation takes place that very often the lengths of hangers ordered are not correct and it is therefore desirable to alter the length of such hangers, but with the types now in general use on the market it is impossible to do so; therefore, we have produced an article whereby the adjustment of the length of the hanger can be readily made in the field and at the time of installation of the hanger if desired.

Another important object of our invention is to provide a means whereby at all times there is an adjustable connection between the trolley wire and its overhead support so that as the trolley wheel or current collector passes below a hanger and offers upward pressure to the trolley wire that the adjustable connection will permit the trolley wire to rise and fall, thus giving flexibility to the trolley wire at its point of support and reducing sparking.

To put these principles into tangible form where they can be used, we employ a device which is illustrated and shown in the attached drawing and a description of which is as follows:

Figure 1 shows an end elevation view of our hanger; the full lines represent one position of the adjustable yokes to be described later, and the dotted lines show another position of the same yokes after the lengths of the hanger rods have been altered, Fig. 2 is a side elevation of Fig. 1.

Fig. 3 shows a side elevation of the device in Figs. 1 and 2 in which the suspension rods have been cut off but not as yet upset on the end.

Fig. 4 shows our invention in a modified form whereby the adjustable yokes can be maintained at varying points on the suspension rod without the necessity of altering the length of the rod.

In Figs. 1 and 2 is shown a construction consisting of two clamping jaws 1, which may or may not be duplicates and which are intended for gripping the trolley wire 2. The clamping jaws are caused to grip the trolley wire by means of the bolt 3 and the nut 4 as shown. The suspension rods 5 may be attached to the clamping jaws in various ways but in the construction herein shown the ends of the rod are upset and engaged with cavities or recesses in the face of the clamping jaws and are maintained therein by pressure from the head of the bolt 3 and the washer 6.

In order to suspend this construction from a messenger or catenary cable it is necessary to close the upper end of the supporting rod 5 and to do this we employ a yoke member 7 which is adjustable or slidably attached to the rods 5.

When this yoke member is in position and the ends of the rod are formed with a head 8, it will be readily seen that a device thus constructed can be suspended from a messenger cable and at the same time support a trolley wire.

If, upon installing the device, it is found that the distance between the messenger cable and the trolley wire will be less than originally expected, then with our construction it is intended that the suspension rod 5 shall be cut off to the proper length and the ends upset, thereby permanently altering or shortening the original length of the hanger. To facilitate this change in length, it is only necessary to employ a hammer and cold chisel or other simple and convenient means to cut the rods 5 and the upsetting of their ends is very easily carried out by means of a peening hammer. The position of the yoke member 7ª shown by dotted line, represents the position of the same after a change in length has been made.

In Fig. 3 is shown the device in Figs. 1 and 2 after the rod has been cut off but before the yoke member has been replaced and the ends of the rod upset. In this case the rod is slightly longer before it is upset than after, as indicated by a comparison with the line X.

We have found that it is not necessary to cut the suspension rods and upset them in order to adjust the distance between the yoke member and the trolley wire which governs the length between the messenger cable 9 and the trolley wire but that other ways may be employed to alter and maintain this variable distance and such a variation in our structure is shown in Fig. 4. In this structure the yoke member is made adjustable upon the rod by means of a set screw 10 and it is not necessary to cut the rod off unless desired but they may be maintained as originally sent out and the upset ends will then act as a safety member in case the set screw should allow the yoke member to slip at any time upon the rod. We have found, however, that with a proper set screw perfect safety can be secured even though the suspension rod may be cut and not upset.

Other means than the set screw 10 can be employed to maintain the yokes in varying positions upon the rod and we do not wish to be limited to either the upset head 8 or the set screw 10 as shown.

It will be readily comprehended that this invention will permit the trolley wire to freely rise and fall at the time of the passage of a trolley pole below the wire at the point of support and in the structure shown in Figs. 1 and 2 the rods 5 may slide up and down in the member 7 and this is especially true if the member 7 is constructed so as to fixedly engage the messenger cable 9. This slidable feature of the members 5 and 7 with respect to each other or to the messenger cable offers greater flexibility to the trolley system and reduces sparking where the trolley is supported.

While we describe the form of construction which we prefer used, we do not desire to be limited to the exact details as shown and described, as alterations and changes can be made which are immaterial and without departing from the spirit of our invention.

Claims:

1. A trolley wire hanger consisting of a wire clamping member, suspending means comprising substantially parallel arms attached to the clamping member and a member slidably mounted on the suspending means and adapted to engage a supporting cable, and means on the parallel arms to permanently retain the slidable member thereon.

2. The combination with a trolley wire clamp and suspension rods attached thereto of a bridging member slidably mounted on the suspension rods and maintaining the rods in a separated position, bosses on the bridging member encircling the suspension rod and means associated with the bosses to adjust the bridging member to any position thereon.

3. The combination with a trolley wire clamp and parallel suspension rods attached thereto of a slidable member mounted on the suspension rods and means for permanently retaining the slidable member on the rods.

4. The combination with a trolley wire clamp and suspension rods attached thereto of a slidable member mounted on the suspension rods, means on the suspension rod for permanently retaining the sliding member thereon, and means for retaining the slidable member at any position on the rods to vary the distance between the clamp and the slidable member.

5. A trolley wire hanger consisting of a trolley clamp, a pair of rods spaced apart and having one end engaging the clamp, a bridging member engaging the rods and closing the end opening therebetween and enlarged means on the ends of the rods for permanently preventing the disengagement of the bridging member therefrom.

6. A trolley wire hanger comprising a trolley wire clamp, a pair of rods spaced apart and having one end engaging the clamp, a bridging member engaging the rods and closing the end opening therebetween and slidably adjustable in a longitudinal direction on the rods and means passing through the bridging member for securing the bridging member at any point on the spaced rods.

7. A trolley wire hanger comprising a trolley wire clamp, a pair of rods spread apart, a bridging member slidably adjustable upon the rods and the ends of the rods upset to retain the bridging member thereon.

8. A trolley wire hanger comprising a trolley wire clamp, suspension means engaging the clamp, a member slidably mounted on the suspension member, means on the ends of the suspension means to permanently prevent the removal of the slidable member and means on the slidable member to secure the slidable member to the suspension member at any point between its ends and the clamp.

In testimony whereof we affix our signatures in the presence of a witness.

GLENN HENRY BOLUS.
WILLIAM A. DARRAH.

Witness:
W. W. HUNZICKER.

Copies of this patent may be obtained for five cents each, by addressing the "Commissioner of Patents, Washington, D. C."